Dec. 11, 1956  S. GREENBERG ET AL  2,773,946
DEVICE FOR DETECTING THE SENSE AND
MAGNITUDE OF A D.C. SOURCE
Filed Sept. 27, 1951

INVENTORS
SOL GREENBERG
PAUL W. SOKOLOFF
BY Percy P. Lantz
ATTORNEY

United States Patent Office 2,773,946
Patented Dec. 11, 1956

2,773,946

DEVICE FOR DETECTING THE SENSE AND MAGNITUDE OF A D. C. SOURCE

Sol Greenberg, Bronx, N. Y., and Paul W. Sokoloff, Phoenix, Ariz., assignors to International Telephone and Telegraph Corporation, a corporation of Maryland Application September 27, 1951, Serial No. 248,624

3 Claims. (Cl. 179—171)

This system relates to D. C. voltage converters and more particularly to D. C. voltage converters wherein the output voltage has both sense and magnitude proportional to the input voltage.

The use of a mechanical or electrical chopper to convert D. C. voltage to A. C. voltage is well-known in the prior art. In practice heretofore the output cycle of such a chopper has been 50 percent, and D. C. voltage converters employing such a chopper have been used to yield a magnitude of A. C. voltage proportional to the D. C. voltage input; and in order to obtain the sense of the input voltage, an additional circuit comparing the phase of the output signal with some reference signal has been necessary. In many applications, such as balanced input circuits and automatic frequency control systems, it is desirable to measure the difference and sense of two D. C. voltages. In systems heretofore proposed, the accuracy of the differential voltage measurement has been reduced because the systems required a voltage swing in each D. C. amplifier from ground to D. C. voltage input level, and sense has been obtained by the addition of a phase comparator circuit.

One of the objects of this invention, therefore, is to provide a system for converting a D. C. voltage to an A. C. voltage having both sense and magnitude proportional to the D. C. voltage input.

A further object of this invention is to provide a system for amplifying a D. C. voltage whereby the output voltage will have sense and magnitude proportional to the original input voltage.

A further object of this invention is to provide a more accurate system of converting the differences of two D. C. voltages whereby the output voltage will have sense and magnitude proportional to the difference of the two input voltages.

Briefly, by this invention, a chopping circuit is used wherein the chopper operates in a manner to produce an unequal output with respect to a given time cycle. The output A. C. voltage has both sense and magnitude dependent on the input voltage. This output voltage may then be amplified in an A. C. amplifier and rectified back to a D. C. voltage in a balanced amplitude detector circuit. The D. C. voltage output of the detector circuit has a sense and magnitude proportional to the D. C. voltage input.

The above-mentioned and other features and objects of this invention and the manner of attaining them will become more apparent by reference to the following description taken in conjunction with the accompanying drawings, wherein.

Figure 1:
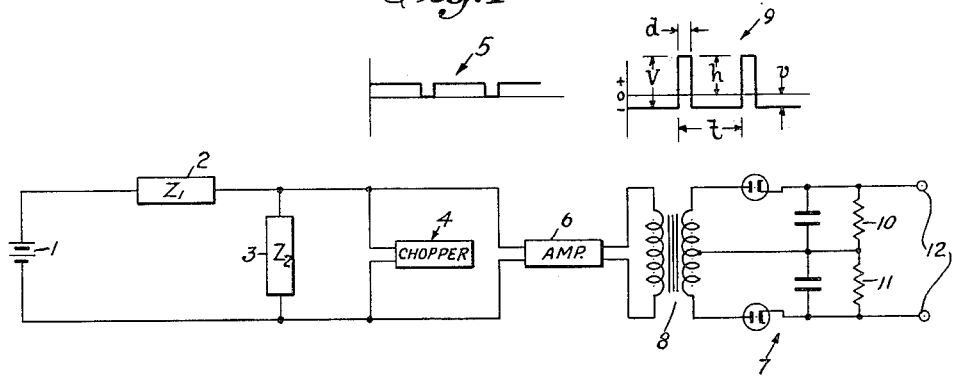
Fig. 1 is a schematic representation of one system for amplifying a D. C. voltage according to the principles of this invention.

Referring to Fig. 1, a source of D. C. voltage 1 is connected in series with two impedances 2 and 3. A mechanical chopper type switch 4 is connected to shunt impedance 3. The chopper type switch has an unequal output cycle controlled by the unequal simultaneous closing and opening of contacts 14 and 15 so that the output across the chopper is represented by the waveform of curve 5. When the chopper type switch is open, the voltage drop across the chopper 4 equals the voltage drop across impedance 3. When the chopper type switch is closed, a zero voltage drop appears across the chopper 4. The output across the chopper 4 is fed to an amplifier circuit 6. This amplified voltage is fed to a balanced amplitude detector circuit, generally indicated at 7, through a coupling transformer 8. The asymmetric wave produced as shown in curve 9 has extreme variation between its positive and negative peak potentials, although it is obvious that the area of the wave above the zero axis equals the area of the wave below the zero axis. Thus voltage $h$ appearing across resistor 10 may be expressed as follows:

$$h = \frac{(t-d)(V-h)}{d} = V\left(\frac{t-d}{t}\right) = V(1\text{-duty cycle})$$

where the duty cycle is equal to $$\frac{d}{t}$$

and the other letters are as shown in curve 9 of Fig. 1. The voltage appearing across resistor 11 may also be expressed as:

$$v = \frac{(V-h)(d)}{d} = V(\text{duty cycle})$$

Thus it is obvious that since the voltage across resistor 10 is in opposition to voltage across resistor 11, the output voltage appearing at 12 is equal to $$V\left(1 - d\frac{d}{t}\right) \text{ or } V(1\text{-}2 \text{ duty cycle})$$

Figure 2:
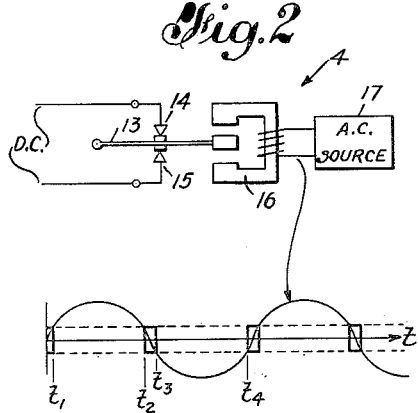
Fig. 2 is a schematic representation of one form of mechanical chopper that may be used with this invention.

The chopper shown schematically in Fig. 2 is of a known type having a rocker or armature 13 adapted to engage contacts 14 and 15 in a predetermined relationship when the coil 16 is energized by an alternating current. When the rocker 13 is driven in response to the sinusoidal cycle supplied by the A. C. source 17, contact is broken first with one contact and then later with the other. However, twice during each cycle the two contacts 14 and 15 are connected in circuit through the rocker 13 as it passes through its neutral position. The time duration for which the contacts 14 and 15 are connected or shorted is approximately 10 percent of a complete cycle. This connecting or shorting of the contacts is utilized to produce an A. C. voltage having an amplitude difference for opposite polarities thus indicating both sense and magnitude of the D. C. input voltage.

To illustrate the action of chopper 4, assume the coil is energized with a sine wave as shown in curve C, resulting in a displacement of the rocker 13 which is proportional to the applied voltage. At $t_1$ the rocker breaks with contact 15 and remains engaged only by contact 14. This condition prevails while the rocker 13 travels to one of its extreme positions and returns, where at $t_2$ the rocker 13 once more re-engages contact 15 and remains in engagement with both contacts 14 and 15 until $t_3$. At this time the rocker 13 has moved far enough to break with contact 14 but remains engaged by contact 15. On the return from its extreme position in this direction, such as when $t_4$ is reached, the contact 14 will again be engaged, while rocker 13 is still engaged by rocker 15.

Figure 3:
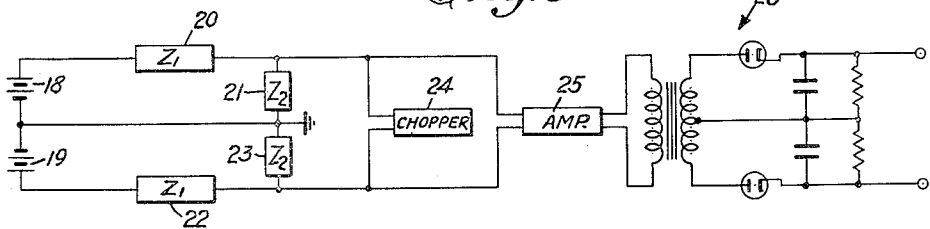
Fig. 3 is a schematic representation of a system for amplifying the difference of two D. C. voltages according to the principles of this invention.

One application of the principles of this invention is in a system for converting the difference of two D. C. voltages to an A. C. voltage as shown in Fig. 3. Two sources of D. C. voltage 18 and 19, connected in opposition, have connected in series with each of them two impedances 20, 21 and 22, 23, respectively. A chopper 24, of the type previously described, is connected to points of similar polarity but of different potential so that the A. C. components that appear across the chopper 24 are proportional only to the difference of the D. C. input voltages and of a sense indicative of which of the two D. C. input sources is the greater. If desired, the A. C. output across chopper 24 may be fed to a balanced amplifier 25 and a balanced amplitude detector circuit 26 in a manner similar to that of the system shown in Fig. 1.

While we have described above the principles of our invention in connection with specific apparatus, it is to be clearly understood that this description is made by way of example only and not as a limitation to the scope of our invention as set forth in the objects thereof and in the accompanying claims.

We claim:

1. A system for detecting the sense and magnitude of a source of direct current voltage, comprising a plurality of impedances connected in series with said source, cyclic means coupled in shunt across at least one of said impedances to shunt said one impedance during a small predetermined portion less than 50% of each of the cycles of said cyclic means to convert said direct current voltage into an alternating current wave having an amplitude difference for opposite polarities thereof, a balanced detector circuit, means to apply said alternating current wave to said detector circuit for detection of the positive and negative portions of said alternating current wave and means to oppose the two detected portions of the alternating current wave to produce an output voltage having both sense and magnitude proportional to that of said voltage source.

2. A system for detecting the sense and magnitude of a source of direct current voltage, comprising a plurality of impedances connected in series with said source, a circuit coupled in shunt across part of said impedances, said circuit having means to open and close said circuit unequally during a given time cycle to convert said direct current voltage into an alternating current wave having an amplitude difference for opposite polarities thereof, a balanced detector circuit, means to apply said alternating current wave to said detector circuit for detection of the positive and negative portions of said alternating current wave and means to oppose the two detected portions of the alternating current wave to produce an output voltage having both sense and magnitude proportional to that of said voltage source.

3. A system for comparing the direct current voltages of two sources comprising a circuit for each of said sources, means coupling the two circuits together in opposition, each of said circuits having a first and a second impedance connected in series with one of said sources, a third circuit connected to each of said first and second circuits at points to shunt one of the impedances in each of said first and second circuits, said third circuit having means to open and close said third circuit unequally during a given time cycle, a balanced detector circuit, and a balanced amplifier circuit coupling said third circuit to said balanced detector circuit to obtain an output the magnitude of which is proportional to the differences of said two voltage sources and the sense of which is indicative of which of the two voltage sources is greater.

References Cited in the file of this patent

UNITED STATES PATENTS

| | | |
|---|---|---|
| 2,038,960 | Schattarik | Apr. 28, 1936 |
| 2,108,014 | Jones | Feb. 8, 1938 |
| 2,297,543 | Eberhardt et al. | Sept. 29, 1942 |
| 2,375,811 | Nelson et al. | May 15, 1945 |
| 2,459,177 | Moseley et al. | Jan. 18, 1949 |
| 2,508,082 | Wald | May 16, 1950 |

OTHER REFERENCES

Abstract, 681,176, published in the O. G. of May 15, 1951, vol. 646, page 1028, filed July 3, 1946.